Oct. 31, 1967

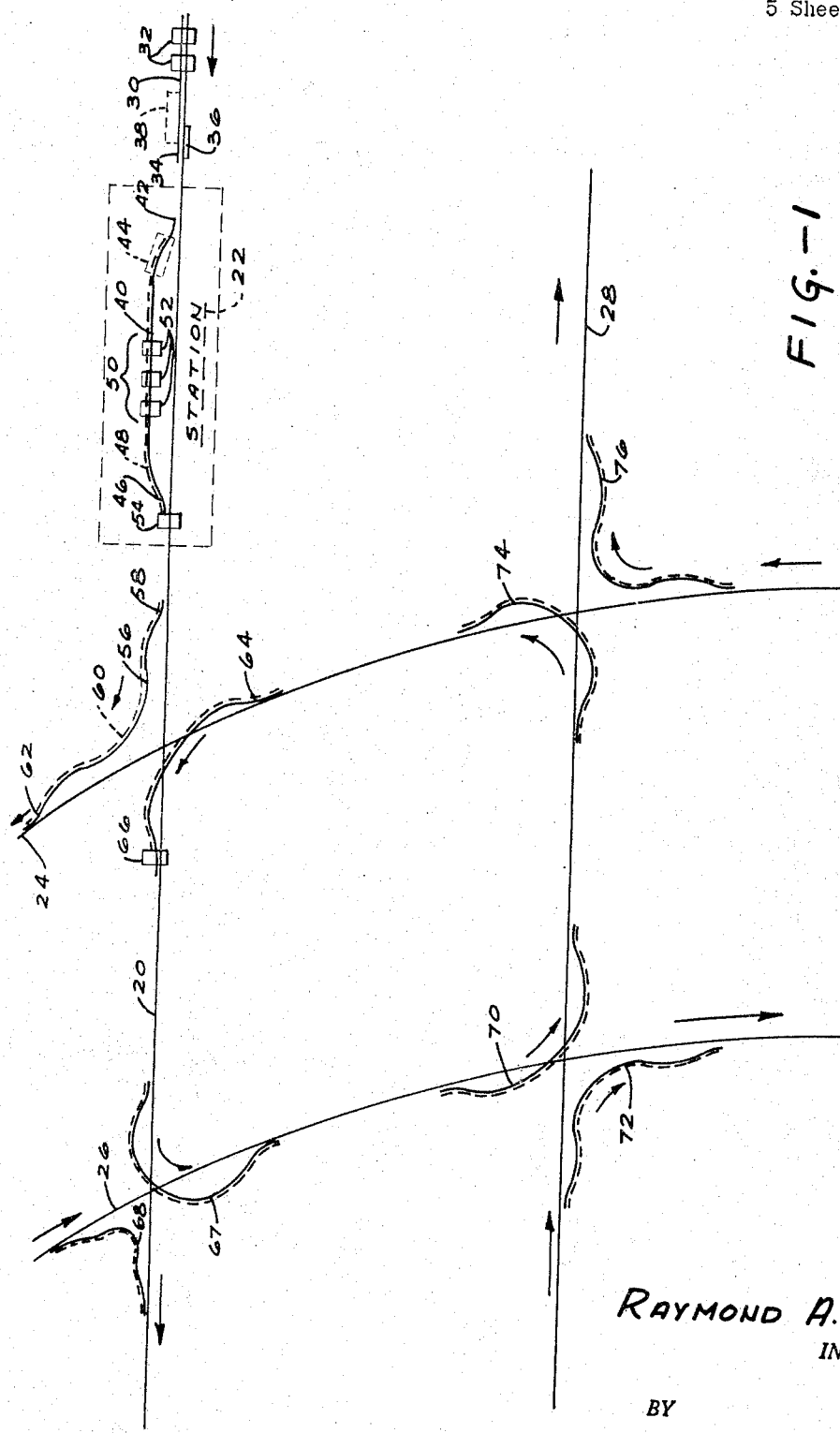

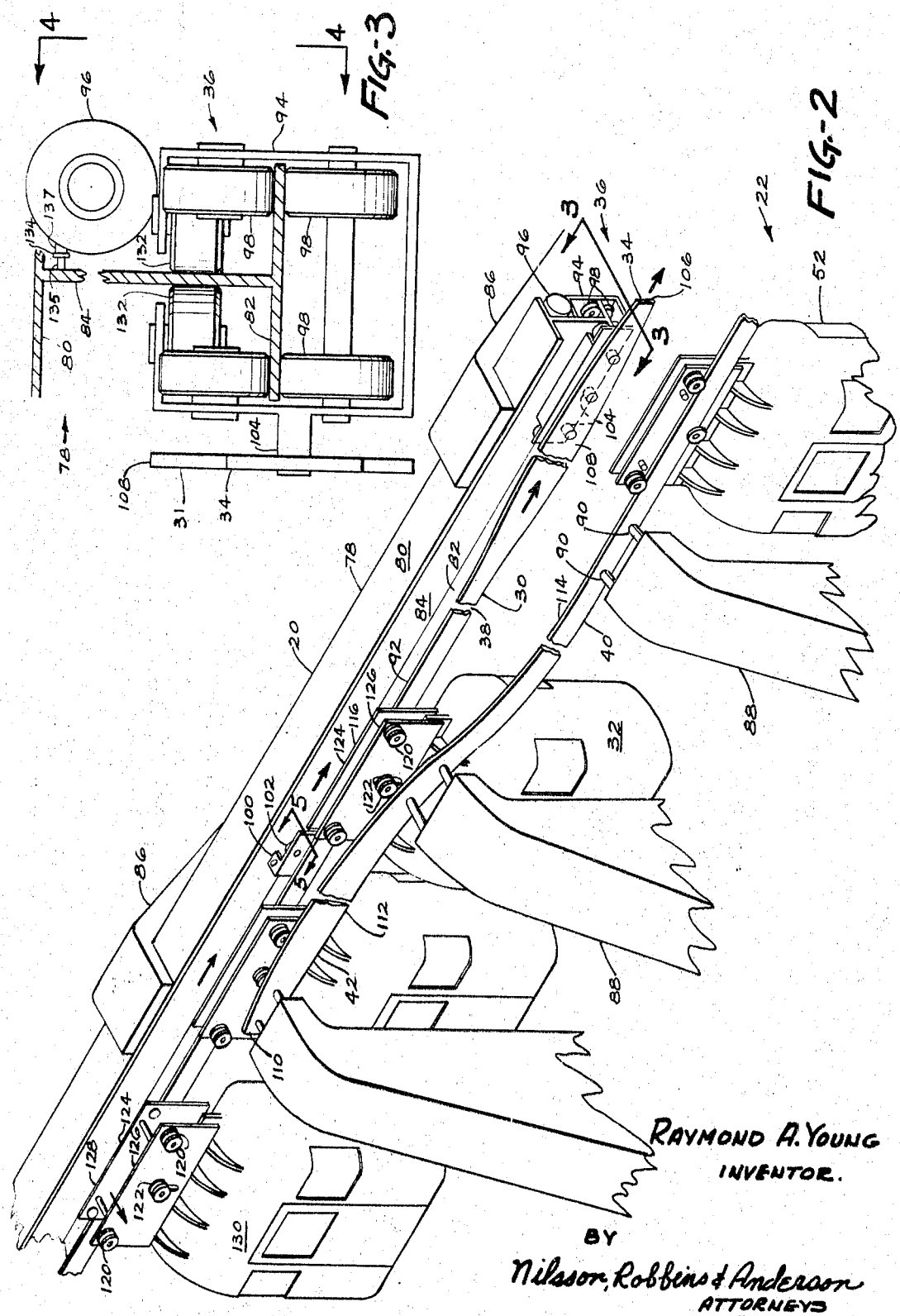

R. A. YOUNG 3,349,719

TRANSIT SYSTEM

Filed Aug. 30, 1965

RAYMOND A. YOUNG
INVENTOR.

BY
Nilsson, Robbins & Anderson
ATTORNEYS.

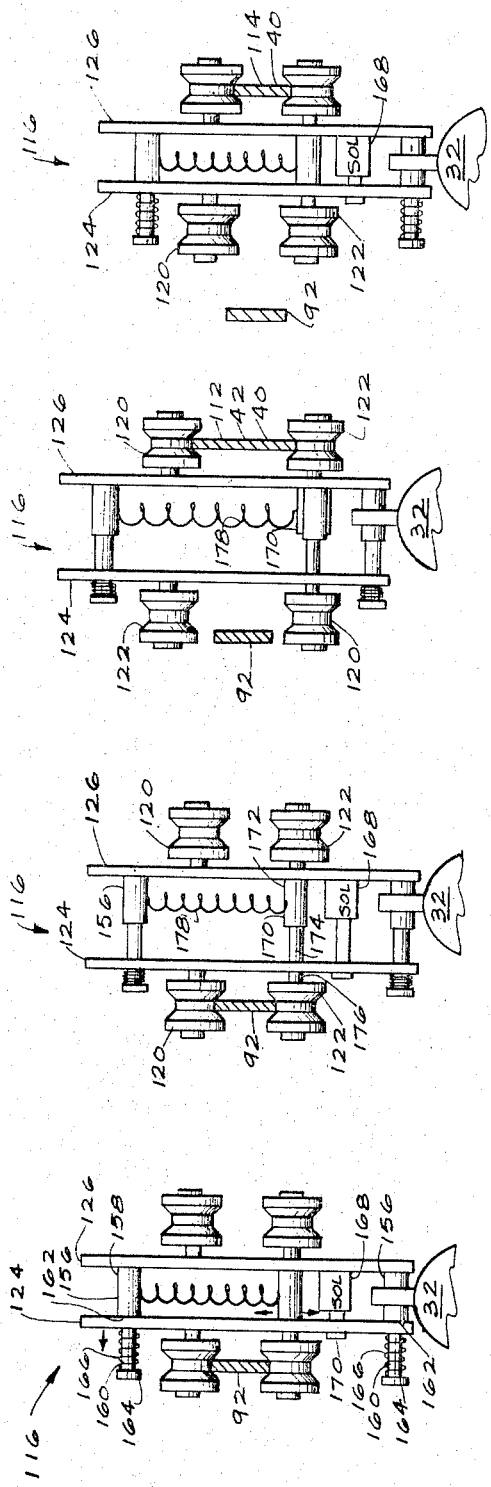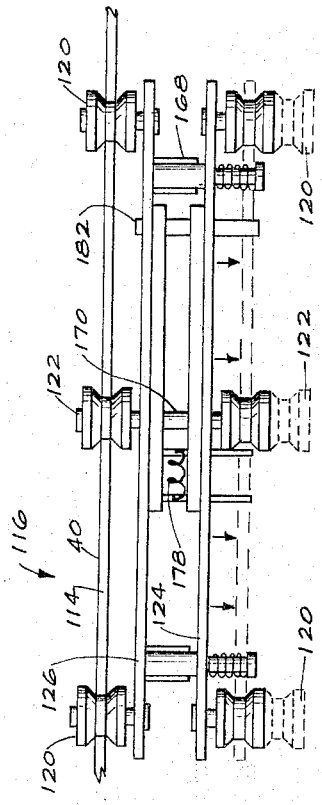
RAYMOND A. YOUNG
INVENTOR.

Oct. 31, 1967  R. A. YOUNG  3,349,719
TRANSIT SYSTEM
Filed Aug. 30, 1965  5 Sheets-Sheet 5
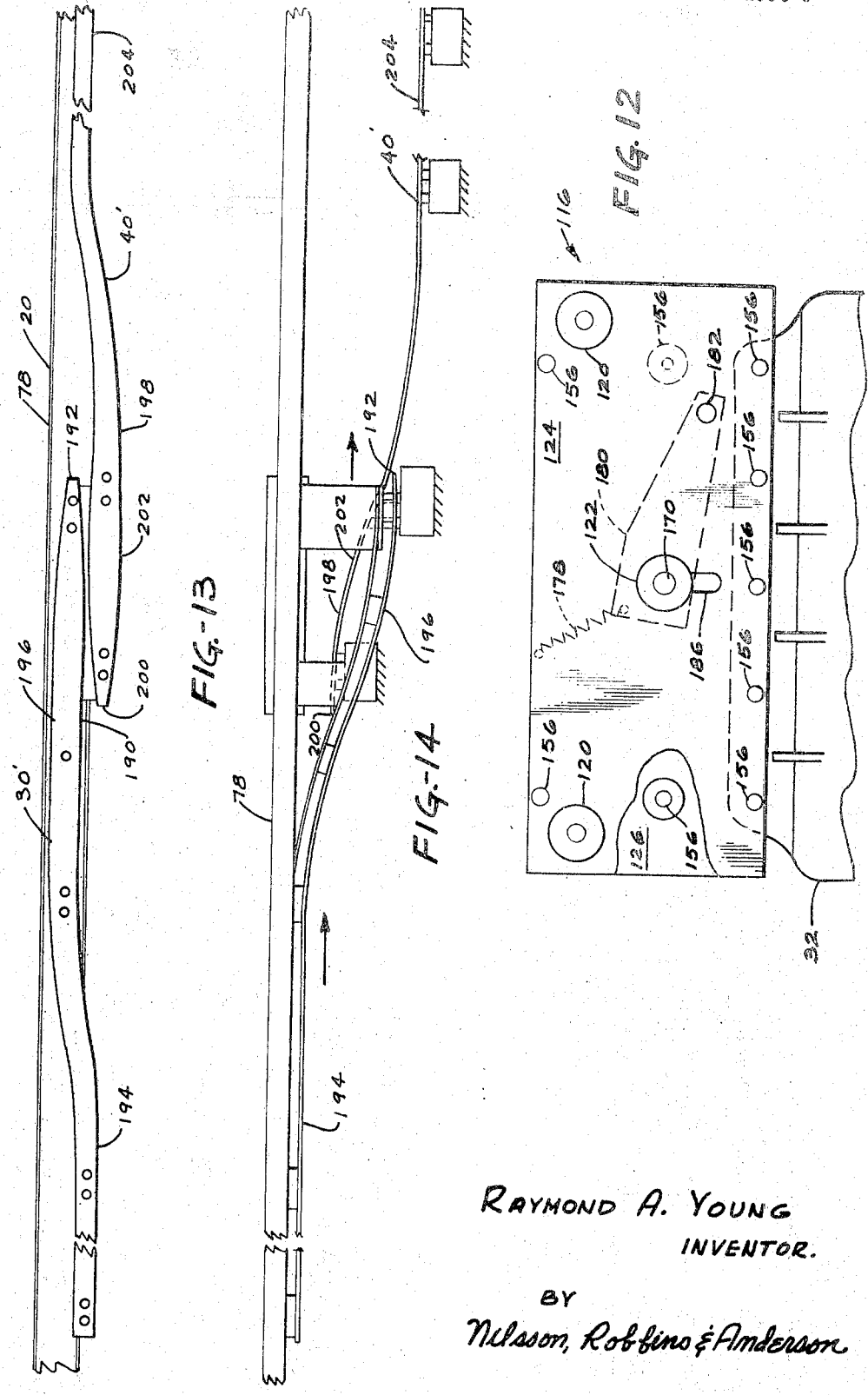
RAYMOND A. YOUNG
INVENTOR.
BY
Nilsson, Robbins & Anderson 3,349,719
TRANSIT SYSTEM
Raymond A. Young, 5105 Via El Sereno,
Torrance, Calif. 90505
Filed Aug. 30, 1965, Ser. No. 483,616
15 Claims. (Cl. 104—91)

ABSTRACT OF THE DISCLOSURE

A transportation system for mass personnel transit including a stationary monorail structure extending between stations for carrying a motorized transporter rail which in turn receives and carries independent cars or passenger units. The transporter rail is a flexible band that is propelled along the monorail structure by electric motor at a substantially constant speed. Individual cars then picked up and let off the transporter rail by means of retractable wheels on the cars.

---

This invention relates generally to common carrying and more particularly to improvements in monorail type systems.

Although the present invention finds particularly useful application in the field of overhead monorail systems of urban and suburban mass rapid transit for personnel on a public basis, and although, in the cause of clarity and brevity, much of the following discussion of examples thereof is directed to such applications, it is to be expressly understood that the advantages of the invention are equally well manifest in other carrier applications such as for example, the automated handling of intra-urban or inter-urban freight and parcels.

Throughout recent history, the need for rapid and economical mass transit, along with the growth of population and its shift toward urban centers, has grown, on at least an exponential basis, more acute year by year. Adding to and making the problem even more difficult of solution is the fact that, with the rapid modernization of contemporary industrial civilization, the acceptable standards of safety, comfort, efficiency, convenience, and reliability have become exceedingly stringent. Furthermore, because satisfactorily adequate and acceptable rapid transit systems have not yet been developed, many entire metropolitan areas are totally, or at least substantially without mass rapid transit on any type of a system basis. Accordingly, for a system to be acceptable in some cities, even if adequate in all other aspects, it must be immediately adaptable on both functional and economic bases, to huge integrated network system utilizations.

Approaches to providing a solution in the past have typically been directed toward improving, by various degrees, the more or less conventional rail or bus systems already in use. The limitations and deficiencies of such approaches have been well proven over particularly the middle third of the current century. Bus type systems imply surface travel on existing, usually already overcrowded, roadbeds with all the well known limitations thereof. In fact, it is hardly accurate to label bus systems as systems or network systems per se in the modern sense of these terms, because typically the degree of actual cooperation or network integration between different branches of the "system" is exceedingly small.

Rail systems on the other hand, have also suffered from the lack of or inherent impossibility of utilization of true system concepts. In addition, rail systems in the past have required extremely expensive construction because the rails have had to be capable of carrying loads of many tons per lineal foot. This has, in turn, been caused by the train concept whereby extremely high load densities are concentrated at the instantaneous position of the train, whether it be a single self-propelled railway car or a conventional multi-car train. In either event, it should be noted, the overall or average loading on the rails is very small because of the short effective "duty cycle" of the train versus the long track; the noteworthy point being the inherent waste of track load capability, or in other words, the wastefully heavy track structure required for average loading which is very small. Such rail systems, in order to avoid surface traffic problems must be constructed either under ground or on elevated structures. Such subterranean construction is obviously expensive; while overhead structures are equally expensive, partly because of wide rights of way required for the necessarily massive structures.

A further disadvantage of prior art rail approaches to the problem is the logistics of their rolling stock in order to handle satisfactorily the varying patterns of personnel flow across a large metropolitan area. In addition, the initial cost of the powered rolling stock and its maintenance cost have traditionally been extremely high.

A final limitation of prior art rail systems to be specifically integrated stems primarily from their inherent required mode of operation; a compromise must be made between maximum high speed service and a usefully high number of station stops. The repeated acceleration and deceleration of the massive systems is costly, diminishes the average velocity, and detracts from the passengers' comfort.

It may be further noted that with the best proposed modern single line rapid transit plan, to cost at least $10,000,000.00 per mile, the maximum contemplated traffic of personnel is 30,000 persons per hour past a given point on the line. This figure of merit, incidentally, compares with a maximum of 3,000 cars per hour for modern high speed trans-urban eight lane automobile freeways which also typically cost approximately $10,000,000.00 per mile. The above mentioned proposed rail system will serve only 3% of the metropolitan population which will be taxed to finance its construction and operation.

It is therefore a prime object of the present invention to provide, by way of new departures in approach and concept, a mass rapid transit system which is not subject to these and other limitations and disadvantages of the prior art.

It is another object to provide such a system and method of common carrying which functions on a true network system basis, and which has a capacity of the order of 30,000 multiple passenger cars or 100,000 individual passengers past any given point in the system network per hour.

It is another object to provide such a system in which the individual carrying units are exceedingly light weight and may carry on the order of one to four persons or the equivalent in materiel.

It is another object to provide such a system in which the carrier rail and its supporting structure may be light in scale, that is, of the order of utility line support structures and which is therefore relatively inexpensive; that is, of the order of less than $1,000,000.00 per mile whereby elaborate networks may be constructed so that very large percentages of population of a metropolitan area can be served with convenience without taxation of non-users.

It is another object to provide such a system which requires only very narrow real estate rights of way thereby permitting installation over existing streets or alleys and further minimizing thereby the total cost of system construction.

It is another object to provide such a system which may be fully automated regarding destination selection, fare computations, inter-branch switching, and logistics of rolling stock for availability when and where needed.

It is another object of the present invention to provide such a system in the normal operation of which substantially no acceleration forces are felt by the passenger once he has been initially accelerated to the nominal operating velocity of the system, even though his "train" passes many stations where other passangers are either picked up or let off or both;

In is another object to provide such a system which in its operation does not require human judgement, with incumbent high probability of error and accident.

It is another object to provide such a system which is safe, reliable, comfortable, efficient, convenient, highly versatile, and low in maintenance cost.

Very briefly, these and other objects are achieved in accordance with one embodiment of some of the structural aspects of the invention in which a continuous stationary monorail is constructed overhead and connects between a large number of urban passenger stations. Travelling along the monorail is an elongated, motorized transporter rail unit. The length of the transporter rail may be 1000 feet or more and is of the character to support a large number of light weight cars along its length. The cars are not self-propelled and have no massive control or braking systems therein. The cars, having four adult seats each, are therefore extremely light, weighing only approximately 250 pounds unloaded. The transporter rail which supports and transports the individual cars may therefore be relatively light in weight also. In this example, it comprises basically an elongate, laterally somewhat flexible metallic band which is propelled along the monorail by a synchronous electric motor connected to drive wheels at its forward end which engage the monorail. The transporter rail runs at a substantially constant velocity of typically approximately 50 miles per hour and, through the utilization of retractable wheels on each of the individual cars, they are picked up or let off by the travelling transporter rail as it passes station facilities. A waiting car to be picked up by the transporter rail is positioned appropriately on the station rail, and if there is available space on the approaching travelling rail, its transfer wheels will be extended and engaged by a forward portion of the transporter rail. The car will then be transferred to the travelling transporter rail from the station rail. Once the wheels are fully supported on the transporter rail, the car experiences a programmed smooth braking along a length of the travelling rail. When the car is substantially at rest with respect to the transporter rail it is shifted toward available space toward the rear of the moving rail.

When a car is to be detached from the transporter rail, from any of the spaces therealong, its transfer wheels are again extended and it is picked off at the next station by an elongated decelerating rail leading ultimately into the station proper. The same programmed deceleration of the car with respect to its pick-off rail is again experienced as the car is sent along the pick-off rail toward the station. As the car is transferred to the station rail, it is caused to move laterally before beginning to decelerate so as to provide clearance between it and a succeeding car remaining on the travelling rail.

Further details of these and other novel features and their principles of operation as well as additional objects and advantages of the invention will become apparent and be best understood from a consideration of the following description taken in connection with the accompanying drawings which are all presented by way of illustrative example only and in which:

FIG. 1 is an overall schematic plan view of a typical major portion of a monorail transit system constructed in accordance with the principles of the present invention;

FIG. 2 is a perspective view of a portion of the system illustrated in FIG. 1;

FIG. 3 is a cross-sectional view of a portion of the structure shown in FIG. 2 taken along the lines 3—3 thereof;

FIG. 7, FIG. 8, FIG. 9, FIG. 10 are cross-sectional views of portions of the structure of FIG. 2 presented for purposes of illustrating the different steps in the operation of some of the apparatus of the invention;

FIG. 11 is a plan view of a portion of structure similar to that illustrated in FIG. 10;

FIG. 12 is a side elevational view, shown partly in phantom, of a portion of the structure of FIG. 11;

FIG. 13 is a side elevation view of a portion of an alternative arrangement of a transit system constructed in accordance with the principles of the present invention; and FIG. 14 is a plan view of the structure illustrated in FIG. 13.

Figure 4:
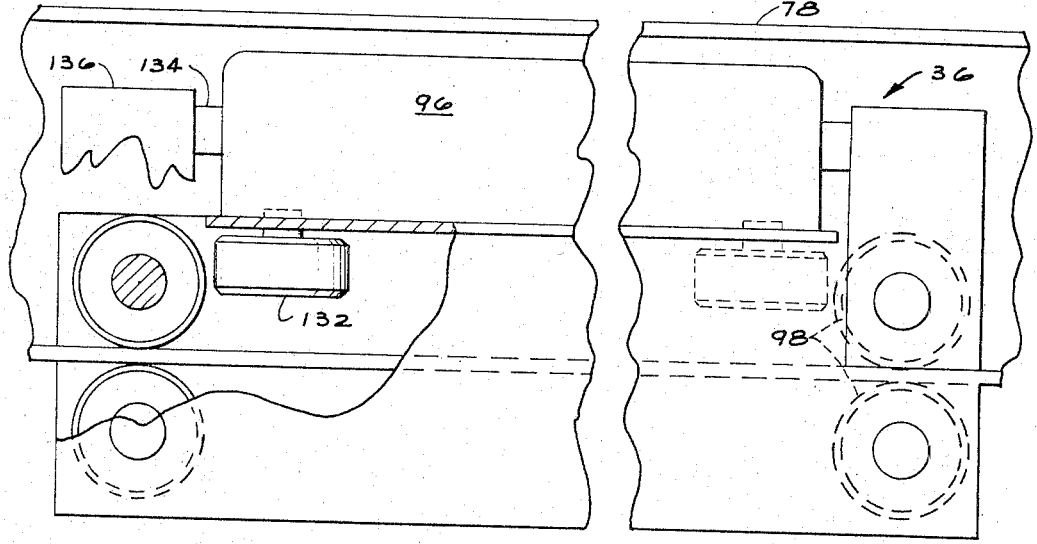
FIG. 4 is a side elevational view of a portion of the structure of FIG. 2 and FIG. 3 taken in the direction of the reference lines 404 of FIG. 3.

With specific reference to the figures in more detail, it is stressed that the particulars shown are by way of example and for purposes of illustrative discussion only and are presented in the cause of providing what is believed to be the most useful and readily understood description of the principles and structural concepts of the invention. In this regard, no attempt is made to show structural details of the apparatus in more detail than is necessary for a fundamental understanding of the invention, the description taken with the drawings making apparent to those skilled in the arts of transportation and mechanical engineering how the several forms of the invention may be embodied in practice. Specifically, the detailed showing is not to be taken as a limitation on the scope of the invention which is defined by the appended claims forming, along with the drawings, a part of this specification.

In FIG. 1 a portion of an example of a transit system network of the invention is illustrated in a schematic manner and indicates with emphasis that the invention utilizes a true system approach. That part of the network shown includes a westbound rail line 20 having, in this example, a basically monorail type of construction and including a typical station 22 disposed therealong as shown. The westbound line 20 interchanges with a northbound line 24 and with a southbound line 26. Similarly, the system includes an eastbound line 28 which also interchanges with the northbound and southbound lines 24, 26.

Shown travelling west on the line 20 approaching the station 22 is a transporter rail 30 carrying a plurality of cars 32 along therewith at a substantially constant velocity. The transporter rail 30 includes a forward pickup rail portion 34, a propulsion or drive unit 36, and an accelerating zone 38 for braking the cars with respect to the transporter rail 30 immediately after being picked up thereby.

The station 22 includes a station rail 40 having a pickoff rail portion 42, a decelerating zone 44, a launching rail portion 46, and a conveyor line 48 for propelling cars from the decelerating zone 44, through the station loading area 50, and to the launch rail portion 46. A plurality of cars 52 are shown at rest in the station area 50; and a car 54 which is to be picked up by the passing transporter rail 30 is shown disposed on the launching rail portion 46 of the station 22.

At the interchange between lines 20 and 24 a transfer rail 56 is disposed having its own pick-off rail portion 58, braking zone (not shown), conveyor line 60, and launching rail portion 62, for cars which are to be switched from a westbound transporter rail to a northbound unit on rail 24.

Similarly, a transfer rail 64 intercouples northbound transporter rails on the line 24 to westbound units on the line 20. To this end a car 66 is shown waiting on the launching rail portion of the transfer rail 64 to be picked up, selectively, by a particular, desired westbound transporter rail.

In like manner transfer rail systems are shown provided at each of the other interchanges indicated in the figure for intercoupling all other desired changes of direction, e.g. west to south via a transfer rail 67, south to west via a transfer rail 68, south to east via a transfer rail 70, east to south via a transfer rail 72, east to north via a transfer rail 74, and north to east via a transfer rail 76.

Referring to FIG. 2 the section of westbound track of the line 20 where it enters the station 22 is illustrated in more detail. The structural rail 78 of the line 20 comprises in this example an I beam configuration including an upper horizontal portion 80, a lower horizontal portion 82 and a vertical interconnecting portion 84. The rail 78 is affixed to supporting stanchions 86 spaced therealong and which are connected to the upper horizontal portion 80 of the rail and from which the rail is thereby supported in a suspending relationship. The station rail 40 is similarly supported on stanchions 88 which, however, connect to the rail by means of horizontal spar members 90 which extend from the upper portion of the stanchions 88 to a supporting connection with the mid portion of one side of the rail 40.

The transporter rail 30, shown travelling to the right, with reference to FIG. 1, or westerly along the line 20 has an elongated carrying portion 92, a forwardly projecting pickup portion 34, and an accelerating zone 38, now shown in this figure, but indicated as being disposed in the region 38 shown broken away from the remainder of the transporter rail 30. Further details of the accelerating zone 38 and its operational principles will be discussed below in connection with a subsequent figure. It may further be noted that the transporter rail 30 has, due to its horizontally narrow and vertically wide cross-section, an appreciable degree of lateral flexibility to enable it to negotiate turn-around loops and other curves in the stationary track while at the same time being exceedingly resistant to bending moments due to loading in the vertical direction.

The transporter rail is seen further to include a drive carriage 94 upon which is mounted the driving propulsion unit 96 which in this particular example is an electric motor powered through stationary conductors which may be insulatingly disposed along the length of the rail 78. The energization for the electric propulsion unit 96 is, in accordance with a presently preferred embodiment thereof, alternating electric current with the motor being of the synchronous character to aid in maintaining a controlled, substantially constant velocity of the travelling transporter rail 30 along the stationary structural rail 78. The drive carriage 94 also includes a plurality of rail engaging wheels 98 which are disposed compressively above and below the lower horizontal portion 82 of the rail 78. Some of the rail engaging wheels 98 are powered through connection with the propulsion or prime mover unit 96. All of the wheels 98 may be rubber covered and treaded for maximum driving friction engagement with the rail as well as to maximize the damping of vibration and noise associated with the travel of the carriage 94 along the rail 78.

A plurality of follower carriage units 100 are also connected in like manner to the transporter rail 30 at spaced intervals therealong for carrying the distributed weight and loading of the rail 30 along the rail 78. As with the wheels associated with the carriage 94, the rail engaging wheels 102 may also be rubber covered for purposes of stability and noise damping. The rail portions of the transporter rail unit 30 are secured to the carriage units, for example the drive carriage 94 and the follower carriages 100, by means of relatively short horizontal stub members 104 which are supportingly interconnected between the carriage units and the vertically mid portion of the rail components in a manner to leave the top, bottom and facial surfaces of the transporter rail 30 clear for engaging and carrying the cars 32.

It may be noted that, for purposes to be enumerated and discussed below, the forward tip 106 of the pickup rail portion 34 of the transporter rail 30 has, in this example, a relatively short overall vertical dimension which tapers substantially symmetrically to an enlarged vertical dimension as shown in the central region 108 of the pickup rail portion, and then gradually tapers down to a standard vertical dimension in the carrying portion 92 of the transporter rail. Again, a discussion of the function of the varying height of the pickup portions of the transporter rail 30 are left to later portions of this specification.

The station rail 40 includes a number of rail portions which are geometrically similar to those of the travelling transporter rail 30. For example, the vertical dimension of the tip end 110 is relatively short and tapers symmetrically to a significantly greater vertical dimension in the region 112 and then tapers diminishingly to a standard rail width in the region 114. The center line of all portions of the station rail 40 is, in this example, substantially horizontal as is that of the travelling transporter rail 30. In addition, the two centerlines are horizontally substantially level with each other. The tip end 110 and the enlarged rail portion 112 of the station rail 40 are disposed permanently, contiguously to the travelling transporter rail 30; that is, to the path thereof. The spacing between the transporter rail 30 and the region 112 of the station rail is sufficient, however, to permit the clearance therebetween of the supporter trucks 116 for the cars 32 which are to pass the station 22 without being picked off by the pick-off rail portion 42 of the station rail 30. Beyond, that is, to the right in the figure, the enlarged height region 112 of the station rail 40 the spacing between the station and transporter rails 40, 30 is significantly increased to permit the passage of travelling cars 32 past stationary cars 52 waiting in the loading area 50 of the station 22.

Although their structure and function will be described in more detail hereinbelow, it may be seem from FIG. 2 that the supporting trucks in this example of the invention carry two different types of rail engaging wheels, viz. an upper set comprising stationary mounted wheels 120 and a spring suspended set comprising wheels 122. Each of the supporting trucks 116 comprises a pair of substantially symmetric mounting plates 124, 126 and the disposition of the wheels 120, 122 mounted on each of the plates is substantially symmetrical whereby a car may be suspended from its left hand side by the carrier portion 92 of the transporter rail or its right hand side of the station rail 40. It may also be noted at this point that the wheels 122 mounted on either side of the supporting truck 116 on their respective left and right mounting plates 124, 126 are effectively on a single axle whereby when one of the wheels 122 is displaced downwardly, the other on the opposite side of the truck 116 follows its downward movement.

Further to be noted from FIG. 2 is that the spacing between the mounting plates 124, 126 of the supporting trucks 116 is expandable as indicated with respect to the carrying truck 128 for the traveling car 130 shown at the rear or left hand edge of the drawing. Thus, in effect, the rail engaging wheels 120, 122 are retractable in a manner to control whether a particular car in the system may be transferred from a moving to a stationary rail or vice versa. In FIG. 2 the first two cars carried by the transporter rail 30 are shown with their mounting plates 126 retracted whereby they do not in any respect engage the pick-off rail portion 42 of the station rail 40. The rearmost car 130, however, with its mounting plate 126 extended laterally as shown will, as it approaches the station 22, be engaged by the tip portion 110 of the pick-off rail portion 42 and will be slightly lifted as it travels along the enlarged height region 112 of the station track in a manner whereby the upper wheels 120 theretofore engaged on the carrying portion 92 of the traveling rail are lifted above and clear from such engagement. At the same time the lower wheels 122 on both mounting plates will be displaced downwardly whereby the sets of wheels on the mounting plate 124 of the truck 128 are totally disengaged and clear of the carrier portion 92 of the traveling rail. At this stage in the pick-off sequence, the car 130 is totally supported upon the enlarged height region 112 of the station rail; and in this condition the car 130 will travel along the station rail being progressively laterally displaced from the structural rail 78 and from all possible contact with the transporter rail 30 or any subsequent cars being carried therealong. Once the car 130 is clear in this manner, it is caused to traverse a braking or decelerating zone 44 (indicated in FIG. 1) by which it is automatically slowed to a velocity appropriate for station handling.

Further details of this switching and pickup type of operation characteristic of the invention will be presented with appropriate discussion below. It suffices here to understand the basic concept involved of switching at full speed by cooperation of the extending-retracting mounting plates of the supporting trucks for the cars with the detachment from the narrower rail to the vertically wider rail by virtue by the symmetrically vertical spreading effected between the sets of wheels 120, 122 as they traverse a region of track having a vertically greater height. It may also be noted that the switching process is a selective one determined solely by the state of extension or retraction of the mounting plates of the car involved. The extending of the mounting plates may be achieved by simple electrical means controlled by the passenger within the car or by control signals from an automated central control facility. In this connection it is also pointed out that in the cause of brevity and conciseness the scope of the present specification is deliberately limited to avoid a discussion of control systems and networks for the mechanical and electro-mechanical structures which are disclosed and claimed herewith. For a discussion of such control systems and their cooperation with coin or card operation destination selection and fare computation systems, reference is made to various prior publications.

Referring to FIG. 3, the cross-sectional view of the rail 78 illustrates its upper horizontal portion 80, its vertical portion 84 and its lower horizontal portion 82, with the drive unit 36 mounted thereon. The drive unit 36 is seen to include the propulsion electric motor unit 96 and the driving, rail engaging rubber covered wheels 98. In addition, in this view a drive carriage 94 is seen to carry also a set of vertical axis wheels 132 which engage the vertical interconnecting portion 84 of the I beam shaped rail 78.

As indicated earlier the energizing power for the propulsion unit 96 may be supplied along a conductor 134 which is mounted on closely spaced standoff insulators 136 distributed along the length of the rail 78 and which is electrically contacted by a sliding or rolling contactor 138 carried by the carriage 94. Projecting to the left of the drive carriage 94 are the set of supporting stub members 104 to which is connected the rail 31 of the transporter rail unit 30. Shown in the figure is the forward portion of the pickup rail 34 of the traveling transporter with the enlarged height region 108 forming a part thereof.

Referring to FIG. 4 the side elevational view of the drive unit 36 illustrates the position of the propulsion motor unit 96 and its advantageous disposition more or less sheltered within the channeled region of the obverse side of the I beam shaped rail 78. Again, the drive carriage 94 is shown supporting and carrying the rail engaging wheels 98 and 132. The shaft 134 of the motor 96 is coupled to a gearbox assembly 136 which is also coupled to the driving wheels of the drive carriage for the powered transporting of the drive unit along the rail 78.

Figure 5:
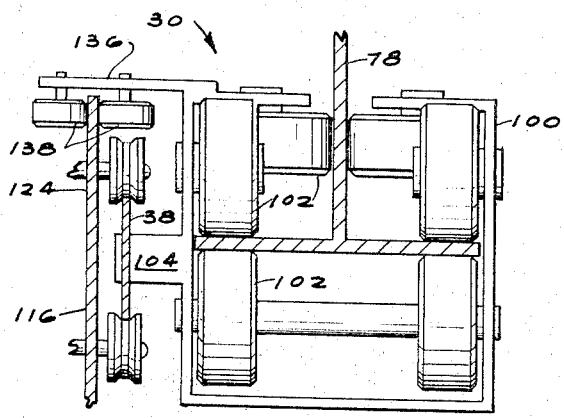
FIG. 5 is a cross-sectional view of a portion of the structure of FIG. 2 taken along the lines 5—5 thereof.

Referring to FIG. 5 a portion of the transporter rail 30, including one of the follower carriage units 100 in the accelerating region 38 of the traveling rail system. Again, the rail engaging wheels 102 are shown in rolling supporting contact with the rail 78 with the supporting stud members 104 extending outwardly laterally from the carriage unit in supporting engagement with the rail portion 38. Also extending laterally outwardly from the carriage 100 is a series of supporting brackets 136 each of which support a pair of braking wheels 138 which may be rubber tired and which grippingly engage the upper portion of the mounting plate 124 of a supporting truck 116.

The accelerating zone 38 of the traveling transporter rail 30 comprises a series of sets of the braking wheels 138 aligned along the length of that portion of the traveling rail in a manner to engage the supporting truck of a car which has just been picked up and decelerated with respect to the traveling rail unit, whereby after having passed through the accelerating zone the car is substantially at rest with respect to the traveling rail unit. The series of sets of braking wheels 138 may provide a program braking sequence for the car in a manner to accelerate it to the velocity of the traveling rail unit with minimum discomfort to the passengers residing within the car substantially independently of the varying mass and other conditions such as temperature and humidity which affect the braking action achieved by the braking wheels 138. The details of structure and operation of an example of the variable braking effect wheels 138 are shown and discussed in connection with the subsequent figure. Additionally, a similar series of sets of braking wheels may be installed in the decelerating zone 44 of the station 22 and function in exactly the same manner to decelerate a traveling car which has been picked off the transporter rail and shuttled into the station 22 via the station rail 40.

Figure 6:
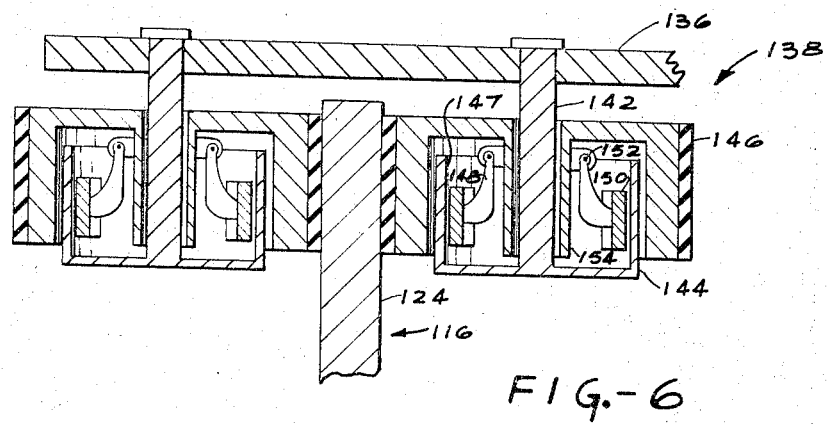
FIG. 6 is an enlarged cross-sectional view of a portion of the structure of FIG. 5.

In FIG. 6 the structural details of an example of a centrifugal braking wheel 138 are illustrated. Affixed rigidly and non-rotatingly to the supporting bracket 136 is an axle 142 which in turn carries an no-rotating brake drum cylinder 144. The brake drum 144 has an inner cylindrical brake shoe engaging surface 146 and is housed hub-like within the rotating braking wheel 138. Thrust bearings for the wheel 138 associated with the axle 142 are conventional and are not illustrated in the figure. As set forth earlier, the wheel 138 also may be covered with a bonded rubber layer 146 which compressively engages an upper portion of the mounting plate 124 of a supporting truck 116.

Carried internally on the hub of the wheel 138 is a set of centrifugally activated engaged braking arms 148 which support, at their outer extremity, an arc-shaped braking shoe 150. The braking arm 148 is articulated with respect to its pivotal connection 152 with the hub portion 154 of the wheel 138 in a manner whereby, when the wheel is at rest, the weight of the combined arm 148 and brake shoe 150 cause it to depend downwardly and inwardly against the hub 154 and out of contact with the brake drum 144. When, however, the wheel 138 is caused to rotate as by engagement with the supporting truck 116, the brake arms and the brake shoe assemblies carried by the rotating hub 154 are caused to be urged centrifugally outwardly into braking engagement with the inner cylindrical surface 146 of the brake drum 144.

The program of braking whereby a series of such braking wheels may be designed to satisfy whatever criteria is desired for decelerating the traveling cars; for example, the number of braking arms 148 within each of the braking wheels 138 is a flexible number. Also adjustable is the magnitude of mass carried by or affixed to the braking arm 148 thereby controlling its centrifugal force and consequently its braking effect with respect to the brake drum 144. Regardless of such design alternatives, however, it should be noted that the braking effect of such a braking wheel assembly is always a dynamic variable depending upon the angular velocity of the outer wheel 138 and its connected brake shoes 150. That is, the faster the braking wheel is revolving, the greater the magnitude of friction between the brake shoe and the brake drum. Also, of course, the lower the angular velocity of the braking wheel, the less the braking effect which may readily, in fact, be designed to be zero while the car is moving at a rate of one or two miles per hour so that this residual relative energy of the car may be used to transport it to the rear of the traveling rail or from the decelerating zone 44 in the station to the loading area 50.

Referring to FIG. 7, FIG. 8, FIG. 9, and FIG. 10, on example of a sequence of operation and of events is illustrated which occurs in transferring one of the cars 32 from its supporting engagement on the carrying portion 92 of the transporter rail 30, as shown in FIG. 7 to a similar supporting relationship on the region 114 of the station rail 40 as shown in FIG. 10.

In each of FIGS. 7 through 10, the car 32 is shown supported from a truck 116 which includes as indicated in connection with FIG. 1, a pair of mounting plates 124, 126 which are parallel to each other and spaced from each other by virtue of a plurality of horizontally extending mounting stubs 156 which include an enlarged diameter portion 158 joining with a reduced diameter portion 160 to form a retaining shoulder 162 the axial displacement of which from the mounting plate 126 to which the stubs 156 are rigidly secured determines the minimum horizontal spacing of the two parallel mounting plates 124, 126. The mounting plate 124 is slidingly supported with a horizontal degree of freedom of motion on the reduced diameter portion 160 of the mounting stubs 156 to limit the magnitude of this horizontal motion of the mounting plate 124 with respect to the mounting plate 126. The end of the reduced diameter portion 160 is provided with an enlarged shoulder forming portion 164, the diameter of which is sufficient to preclude the movement of the mounting plate 124 therebeyond.

A compression coil spring 166 for biasing the mounting plate 124 against the retaining shoulder 162 at a maximum distance from the shoulder forming portion 164 is disposed about the reduced diameter portion 160 of the mounting studs and is retained thereon between the shoulder forming portion 164 and the outer surface of the mounting panel 124.

To maximize the horizontal separation between the mounting panels 124, 126, as solenoid 168 mounted in this example on the inside surface of the mounting plate 126 and having an armature 170, which is affixed to the mounting panel 124, is energized in a manner to urge the mounting panel 124 outwardly toward the shoulder forming portions 164 of the mounting studs 156 against the compressive forces of the return coil springs 166.

In FIG. 8, this energized state of the solenoid 168 and the expanded disposition of the spacing between the mounting plates 124, 126 is illustrated. The effect of this operation, it is to be noted, is to shift the mounting plate 126 and the car 132 laterally to the right, away from the carrying rail portion 92 from which the entire assembly remains suspendingly supported. In this connection, it may be noted that, as indicated earlier, in reference to FIG. 2, the upper wheels 120 are fixedly mounted on the plates 124, 126 at positions substantially horizontally level with each other and these wheels are adapted to ride along the top surface of the supporting rails such as the carrying rail portion 92 as shown in FIG. 7 and FIG. 8.

In contrast to the above described mounting arrangement for the wheels 120, the spring suspended wheels 122 are mounted on a single axle assembly 170, an outer housing portion 172 of which carries the right hand, as viewed in the drawing, wheel 122 in a laterally fixed relation with the mounting panel 126. An inner telescoping portion 174 of the axle assembly 170, passes through a slot in the supporting panel 124 and supports an enlarged diameter hub portion 176 against the outer surface thereof. Means, not shown, associated with the hub portion 176 cause the left hand lower wheel 126 to be carried laterally back and forth by the mounting panel 124 in a fixed lateral relationship therewith as the solenoid is energized and deenergized. An upwardly biasing tension supporting element such as a coil spring 178 is coupled between the axle assembly 170 and a fixed portion of the supporting truck 116 such as, for example, one of the stubs 156. By this means, shown only schematically here, the telescoping axle assembly 170 with its set of lower wheels 122 constitutes a vertically displaceable, upwardly biased supporting and stabilizing truck with rides along the lower surfaces of a supporting rail such as the carrying rail portion 92 shown in the FIGURES 7 and 8.

In FIG. 8, by operation of the solenoid 168, the car 32 and the mounting plate 126 portion of the supporting truck 116 have been shifted laterally to the right as the car is being carried along to the carrying rail portion 92 Consequently, the right hand wheels 120, 122 viz. those associated with the mounting plate 126 are also projected or extended to the right. In this manner, the truck 116 is shown adapted for engagement with the tip portion 110 of the pick-off rail portion 42 of the station rail 40, not shown in FIG. 8 (see FIG. 2).

Referring to FIG. 9, the car 32 with its supporting truck 116 has progressed further along the station rail 40 after the wheels 120, 122 of the mounting plate 126 have engaged the pick-off rail portion 42 thereof. At the particular time illustrated in FIG. 9, the truck 116 is traversing the enlarged height region 112 of the station rail 40 which results in a pair of cooperating effects. Firstly, the symmetrically tapered increased height portion 112 causes the truck 116 to be elevated as shown in a manner whereby the wheel 122 of the mounting panel 124 has been lifted clear of the carrying rail portion 92 of the transporter rail, this by virtue of the vertically rigid connection between the supporting shaft of the wheel 122 and the mounting panel 124. Secondly, the lower portion of the increased height rail segment 112 has displaced the wheel 122 associated with the mounting plate 126 downwardly, consequently extending the spring 178 and carrying the axle assembly 170 downwardly, as shown, to carry the wheel 120 of the mounting panel 124 downwardly and clear from the lower surface of the carrying rail 92.

Thusly, it is apparent from the presentation of FIG. 9, that at the time therein depicted the car 32 and its supporting truck 116 are supportingly and structurally clear of the carrying rail 92 and are totally supported from the enlarged height portion 112 of the station rail 40. The car is therefore freed to be transported along the station rail 40 to the right to obtain further clearance from the carrying rail 92 and from subsequent or following cars 92 being carried thereby.

Once thusly clear of the carrying rail 92, as shown in FIG. 10, the solenoid 168 may be de-energized permitting the relative retraction of the mounting plate 124 with respect to the mounting plate 126 of the truck 116 as shown. Once thusly totally clear the car 32 and its supporting truck 116 progress to the standard height region 114 of the station rail 40 and from there the car may be transported or permitted to coast into the passenger loading area 50 (see FIG. 1).

Although the representation of the sequence of events presented in FIGS. 7–10 illustrates the switching or pick-off operation from the traveling transporter rail 30 to the station rail 40, it may be readily understood that the substantially identical process is repeated when it is desired to pick up such a car by the transporter rail from the launching rail portion 46 of the station rail 40. In this connection when a car such as one of the cars 52 shown in the passenger loading area 50 of the station 40 in FIG. 1 is ready to be picked up and the next approaching transporter rail 30 has been determined to have the desirable destination and has been determined as by automatic signals to have available space thereon, the car is moved by the conveyor line 48 to the position 54 on the launching rail portions 46. At the same time the solenoid 168 of the supporting truck 116 is energized to extend the mounting plate 124 and its associated wheels 120, 122 so that they will be engaged by the forward tip of the pickup rail portion 34 of the traveling transporter rail 30. Immediately after secure engagement thereby, the wheels are lifted and spread vertically by the enlarged height region 108 of the pickup rail portion 34.

In this manner the car is cleared from the station rail 40, the solenoid 168 may be de-energized, and the car permitted to pass through the accelerating zone 38 and then travel slowly toward the rear of the transporter rail 30 onto its carrying rail portion 92 from whence it may be selectively picked off at any desired station regardless of its relative position along the carrying rail portion with respect to cars being carried thereby.

Referring to FIG. 11, a plan view of structure similar to that shown schematically in FIG. 10 is illustrated. The supporting truck 116 is shown supported on the rail portion 114 of the station rail 40 with the upper wheels 120 associated with the mounting panel 126 disposed on top of the rail portion 114 and the lower spring suspended wheel 122 riding along the lower surface thereof. The mounting panel 124 is shown in two positions, in solid lines with the solenoid 168 not energized and in dashed lines as extended with the solenoid 168 energized, with the wheels 120, 122 consequently in a position for engagement with the pickup portion 34 of the approaching transporter rail 30. In this view the axle assembly 170 for the spring suspended lower wheels 122 is shown carried by a pivoted carriage 180 which is pivotally connected to the supporting truck 116 by the pivotal pin 182 which may be affixed rigidly to the mounting panel 126 as shown.

In FIG. 12 the pivoted carriage 180 which is supported by the pin 182 and which carries the axle assembly 170 for the lower, spring suspended wheels 122 is shown in a schematic manner. The axle assembly 170 protrudes through the mounting panel 124 by means of a vertical clearance slot 186 provided therein with the tension spring 178 urging the carriage 180 upwardly so that the wheel 122 will compressively engage the underside of a supporting rail to which the truck 116 may be connected. In the manner described earlier, the upper set of wheels 120 are adapted to ride on the top surface of the same rail. Various ones of the spring loaded mounting stubs 156 are also indicated in FIG. 12 as connecting, horizontally expandably, the mounting panel 124 to the opposite mounting panel 126 in a manner whereby the truck 116 supports the car 32.

Referring to FIG. 13 and FIG. 14 an alternative example of the invention is illustrated in accordance with which the basic rail station 78 of the line 20 may be substantially identical to that referred to above. However, the moving transporter rail 30' is different particularly in its forward, pickup rail portion 190. Instead of the rail portion 190 being disposed in a straight line contiguous and continuously parallel to the rail 78, the forward pickup tip portion 192 is displaced upwardly and parallel to the succeeding carrying portion 194. At the same time, as seen in FIG. 14, the traveling portion 192 is displaced laterally outwardly also in a manner for the tip portion to be parallel with the track 78. As in the previous example, the tip portion of the pickup rail 190 is followed by an enlarged height portion 196. The function and operation of each of these portions in the pickup and accelerating of a car may be substantially identical to that described in connection with FIGS. 7–10.

Similarly, the pickoff rail portion 198 of the station rail 40' is alike in function to that of the previously discussed examples. Structurally, however, the station rail portion 198 includes a tip portion 200 followed by an enlarged height portion 202 which are displaced downwardly from and parallel to the centerline of the main portion 204 of the station rail 40'. The switch cooperation, however, between the pickoff rail portion 198 and cars being carried by the carrying rail portion 194 may be identical to that of the previous examples. Similarly, the pickup cooperation between the moving rail portion 190 and cars standing on the station rail 40' is substantially the same. An important distinction, however, is that the full length of the station rail 40', may be parallel to the rail 78 and in a car switching or pickup relation at all points therealong with the pickup portion 190 of the transporter rail 30'.

Consequently, any car on the station rail 40' may be selectively picked up whether or not it is at the "launching" end thereof. For a particular car to be thusly picked up, the switching wheels are extended, as in FIG. 8, and are engaged by the approaching pickup rail. Without substantial acceleration, the car is effectively cleared from the station track, moved laterally until clear of all other standing cars, and then accelerated to the velocity of the transporter rail. In this manner, the possibility of picking up a particular car is not determined by the location of the car on the station rail, but, rather, only by whether the retractable wheels of the car's supporting track are laterally extended.

It may be noted that the purpose in the vertical relative displacement of the moving pickup rail portion and the stationary pickoff rail portion is to provide clearance therebetween as a transporter rail 30' passes a station.

There have been disclosed a number of examples of a transit system and different structural components thereof which achieve the objects and exhibit the advantages set forth earlier in this specification. As a further description of certain particularly advantageous and important aspects of the invention, it may be noted that with a propelled transporter rail 1,000 feet long, 200 feet at the front is used for acceleration, at a rate of approximately 15 feet per second and 800 feet is used for carrying cars. If the cars are spaced 8 feet apart, then 100 cars may be carried. When the transporter rail is 2,000 feet long, then 1800 feet would carry 220 cars.

When the longer transporter units are spaced one-half minute, or one-half mile, apart at 60 miles per hour, the capacity is 440 cars per minute. This compares with freeway capacity of 50 cars per lane per minute at 60 miles per hour. This monorail system then has a capacity equal to eight and four-fifths freeway lanes all in one direction.

At one passenger per car, the capacity of the system of the present invention is 440 per minutes or 26,400 per hour for each single monorail line, or when each car carries its capacity of four, the capacity is 1,760 per minute or 105,600 per hour. This compares with the expected capacity of the proposed new train system mentioned earlier with which the expected capacity would be 30,000 persons per hour in each direction.

It should furthermore be noted that the capacity of the presently described system is greater by an order of magnitude than that of the prior art systems while at the same time requiring a total expenditure for right-of-way acquisition and construction of less than the prior art systems by an order of magnitude, while providing, in addition, a great deal more versatility and convenience in use.

What is claimed is:
1. Transit system comprising:
   a length of stationary, elevated monorail interconnecting a plurality of station locations;
   an elongate transporter rail unit supported on said monorail and being disposed generally parallel thereto and having propulsion means carried by said transporter rail unit in motive engagement with said monorail for effecting powered longitudinal motion of said transporter rail unit wtih respect to said monorail;
   said transporter rail unit further comprising an elongate forward, accelerating portion and an elongated, car holding portion coupled smoothly to said accelerating portion;
   a station rail means disposed at each of said station locations having a car pickoff rail portion; and a plurality of individual cars adapted to be carried by said transporter rail unit and having a first set of supporting wheels selectively engageable with said transporter rail unit when said car is disposed at one of said station locations on said station rail means thereof and having a second set of supporting wheels selectively engageable with said car pickoff portion of said station rail means when said car is disposed on said car holding portion of said transporter rail unit; said car pickoff portion having an elongated decelerating portion;

said accelerating portion of said transporter rail unit and said decelerating portion of said car pickoff portion of said station rail means having braking means for engaging predetermined ones of said cars and for bringing them smoothly and substantially to rest with respect to said accelerating and decelerating portions respectively.

2. Monorail transit network comprising:
an elevated monorail interconnecting a plurality of station locations;
an elongate traveling transporter rail unit supported on said monorail and being disposed generally parallel thereto and having propulsion means carried by said traveling rail unit in motive engagement with said monorail for effecting powered longitudinal motion of said traveling rail unit with respect to said monorail;
said traveling rail unit further comprising an elongate forward accelerating portion having a length of approximately the order of 200 feet, said accelerating portion having braking means carried thereby, said traveling unit further including an elongated car carrying portion coupled smoothly to said accelerating portion;
a station rail means disposed at each of said station locations and having a passenger loading portion and a car pickoff portion;
a plurality of multiple passenger cars adapted to be carried by said transporter rail unit and each car having a first set of supporting wheels selectively engageable with said traveling rail unit when said car is disposed at rest at one of said station locations and having a second set of supporting wheels selectively engageable with said car pickoff portion of said station rail means when said car is disposed on said car holding portion of said traveling transporter unit;
said car pickoff portion including a decelerating portion having a length of the order 200 feet and having braking means distributed therealong for engaging a traveling car for bringing it smoothly and substantially to rest.

3. The invention according to claim 1 in which said transporter rail unit comprises a traveling rail structure having a predetermined degree of lateral flexibility for negotiating curves along said length of monorail.

4. The invention according to claim 1 in which the said transporter rail unit has a length of the order of at least a few hundred feet.

5. The invention according to claim 1 in which said individual cars each include a supporting truck means for interconnecting the cars suspendingly to said transporter unit and upon which are carried said first and second sets of supporting wheels.

6. Transit system comprising:
a length of stationary elevated monorail interconnecting a plurality of station locations;
an elongate transporter rail unit supported on said monorail and being disposed generally parallel thereto and having propulsion means carried by said transporter rail unit in motive engagement with said monorail for effecting powered longitudinal motion of said transporter rail unit with respect to said monorail;
said transporter rail unit further comprising an elongate forward, accelerating portion and an elongate car holding portion coupled smoothly to said accelerating portion;
a station rail means disposed at each of said station locations and having a car launching rail portion and a rearwardly terminating car pickoff rail portion, said car pickoff portion having an elongated decelerating portion;
a sub accelerating portion of said transporter rail unit and a sub decelerating portion of said car pickoff portion of said station rail means having braking means for engaging predetermined ones of the cars and for bringing them smoothly and substantially to rest with respect to said accelerating and decelertaing portions respectively;
a plurality of individual cars each including supporting truck means for interconnecting the car suspendingly to said transporter rail unit, said supporting truck means including a body assembly having a transporter railside and a station railside;
a first set of transporter rail unit engaging wheels carried by said body assembly of said supporting truck means on the said transporter railside thereof;
a second set of station rail engaging wheels carried by said body assembly on the said station railside thereof;
said body assembly including wheel positioning means coupled to said sets for laterally selectively extending and retracting said wheels of either of said sets.

7. The invention according to claim 6 in which each braking means comprises a series of braking wheels mounted along each of said decelerating and accelerating portions for rolling engagement with a said car when it is traversing a said decelerating or accelerating portion.

8. The invention according to claim 7 in which each set of braking wheels include; an inner non-rotatable braking drum having an inner cylindrical braking surface; an outer car engaging wheel disposed concentrically with said drum and having a hub portion disposed within said drum; and brake shoe means rotationately carried by said hub portion and being pivotally connected thereto in drum engageable relation with the outward radio force magnitude depending upon the angular velocity of said hub portion within said drum.

9. The invention according to claim 6 in which said forward, accelerating portion of said transporter rail unit includes a car pickup rail portion having; a terminal tip portion with a transverse vertical portion which is not greater than that of said car holding portions; a tapered height portion connected smoothly to said tip portion having a vertical width which tapers, rearwardly along its length, from that of said tip portion to a vertical width which is greater than that of said car holding portion and thence to equal and join, in smooth transition, that of said car holding portion.

10. The invention according to claim 9 which further includes disengagement means controlled by engagement of one of said sets of supporting wheels with its respective associated one of said car pickup portion of said transporter rail unit or car pickoff portion of said station rail for disengaging the other set of supporting wheels from its respective associated one of said transporter rail unit or station rail and thereby shifting support for said car to said one set of supporting wheels from said other set.

11. The invention according to claim 9 in which said car pickoff portion of said station rail means includes a rail portion having; a rearwardly, with respect to the sense of forward motion of said transporter rail unit along said monorail, projecting terminal tip portion with a predetermined transverse vertical width which is not greater than said car launching rail portion; and a tapered height portion connected smoothly to said tip portion having a vertical width tapering forwardly along its length from that of said tip portion, to a vertical width which is greater than that of said car launching portion and thence to equal and join, in smooth transition, to that of said car launching portion.

12. The invention according to claim 6 in which said body assembly of said supporting truck means comprises; first and second laterally just opposed mounting plates, said first set of transporter rail unit engaging wheels and said second set of station rail engaging wheels being carried respectively on said first and second mounting plates; said wheel positioning means including motive spreader means disposed between juxtaposed opposed mounting plates for selectively increasing and decreasing the lateral spacing thereof thereby effecting said extending and retracting respectively of the said sets of supporting wheels.

13. The invention according to claim 11 in which the tip portion of said car pickup portion of said transporter rail unit with respect to said monorail is parallel thereto and laterally displaced from towards said station rail means by a horizontal car clearance distance which is greater than the lateral extent of said cars being carried by said car holding portion of said transporter rail unit and in which said truck pickup portion includes a transition rail section not parallel to said monorail for a smoothly interconnecting said tip portion of said pickup portion to the remainder of said transporter rail unit.

14. The invention according to claim 13 in which said tip portion of said car pickoff portion of said station rail means with respect to said monorail is parallel to and is laterally displaced theretoward from the remainder of said decelerating portion of said station rail means by a horizontal car clearance distance which is greater than the lateral extent of said cars supported on said station rail means and in which said pickoff portion includes a transition rail section not parallel to said monorail for smoothly interconnecting said tip portion of said station rail means to the remainder of the rail unit.

15. The invention according to claim 14 in which one of said tip portions of said car pickoff and car pickup portions is vertically displaced above the other by a distance to provide clearance therebetween when a said truck transporter rail unit is passing a said station location.

No references cited.

ARTHUR L. LA POINT, *Primary Examiner.*

D. F. WORTH, *Assistant Examiner.*